US012593136B2

(12) United States Patent
Ai et al.

(10) Patent No.: US 12,593,136 B2
(45) Date of Patent: Mar. 31, 2026

(54) BRIGHTNESS DETECTION METHOD AND APPARATUS, CONTROL METHOD AND APPARATUS FOR PHOTOGRAPHIC APPARATUS, AND MEDIUM

(71) Applicant: SHENZHEN MICROBT ELECTRONICS TECHNOLOGY CO., LTD., Shenzhen (CN)

(72) Inventors: Guo Ai, Shenzhen (CN); Qian Tao, Shenzhen (CN); Zuoxing Yang, Shenzhen (CN)

(73) Assignee: Shenzhen Microbt Electronics Technology Co., Ltd., Guangdong (CN)

( * ) Notice: Subject to any disclaimer, the term of this patent is extended or adjusted under 35 U.S.C. 154(b) by 115 days.

(21) Appl. No.: 18/728,518

(22) PCT Filed: Sep. 1, 2023

(86) PCT No.: PCT/CN2023/116558
§ 371 (c)(1),
(2) Date: Jul. 12, 2024

(87) PCT Pub. No.: WO2024/051605
PCT Pub. Date: Mar. 14, 2024

(65) Prior Publication Data
US 2025/0097588 A1 Mar. 20, 2025

(30) Foreign Application Priority Data
Sep. 5, 2022 (CN) .......................... 202211075503.6

(51) Int. Cl.
*H04N 23/71* (2023.01)
*H04N 23/667* (2023.01)
(52) U.S. Cl.
CPC ........... *H04N 23/71* (2023.01); *H04N 23/667* (2023.01)
(58) Field of Classification Search
CPC ...... H04N 23/667; H04N 23/71; H04N 23/70; H04N 17/002; G01J 1/44; G01J 2001/446
See application file for complete search history.

(56) References Cited

U.S. PATENT DOCUMENTS

2004/0047621 A1 3/2004 Shimizu et al.
2007/0103562 A1 5/2007 Kaneko et al.
(Continued)

FOREIGN PATENT DOCUMENTS

CN 105049731 A 11/2015
CN 113257208 A 8/2021
(Continued)

OTHER PUBLICATIONS

Kuang, Yin-hu, et al. Simulation of Exposure Brightness Estimation of Night Vision Image Taken by Camera, Nov. 15, 2018, p. 220-223 (School of Physics and Electronic-Electrical Engineering, Yinchuan Ningra, 750021, China) (with English Abstract).

*Primary Examiner* — Lin Ye
*Assistant Examiner* — Steven Daniel Barry
(74) *Attorney, Agent, or Firm* — Dickinson Wright PLLC

(57) ABSTRACT

Provided in the embodiments of the present application are a brightness measurement method and apparatus, a control method and apparatus for a photographic apparatus, and a medium. In the brightness measurement method, a brightness measurement circuit is used to perform brightness measurement, the brightness measurement circuit comprising: a photosensitive diode, a switch and at least two measurement groups. The brightness measurement method specifically comprises: selecting a target measurement group from among at least two measurement groups; controlling a switch to connect to the target measurement group; performing voltage measurement on the target measurement group, and performing analog-to-digital conversion on the voltage measurement result to obtain a digital voltage, wherein the analog-to-digital conversion corresponds to the number of sampling points, the at least two measurement groups comprise a preset measurement group, the preset measurement group corresponds to a target brightness range, and the ratio of the target brightness range to the number of sampling points meets a preset precision requirement; and determining a brightness measurement result according to the digital voltage.

15 Claims, 4 Drawing Sheets

(56)  References Cited

U.S. PATENT DOCUMENTS

| 2007/0291158 | A1 |  | 12/2007 | Kuno et al. |
| 2016/0267322 | A1 |  | 9/2016 | Miura et al. |
| 2019/0238737 | A1 |  | 8/2019 | Matsuno et al. |
| 2022/0210308 | A1 | * | 6/2022 | Zhou .................... H04N 23/76 |

FOREIGN PATENT DOCUMENTS

| CN | 113473035 | A | 10/2021 |
| CN | 113498238 | A | 10/2021 |
| CN | 115150558 | A | 10/2022 |
| EP | 2629506 | A1 | 8/2013 |
| JP | 2000078463 | A | 3/2000 |
| JP | 2021090096 | A | 6/2021 |
| WO | 2016015587 | A1 | 2/2016 |

* cited by examiner

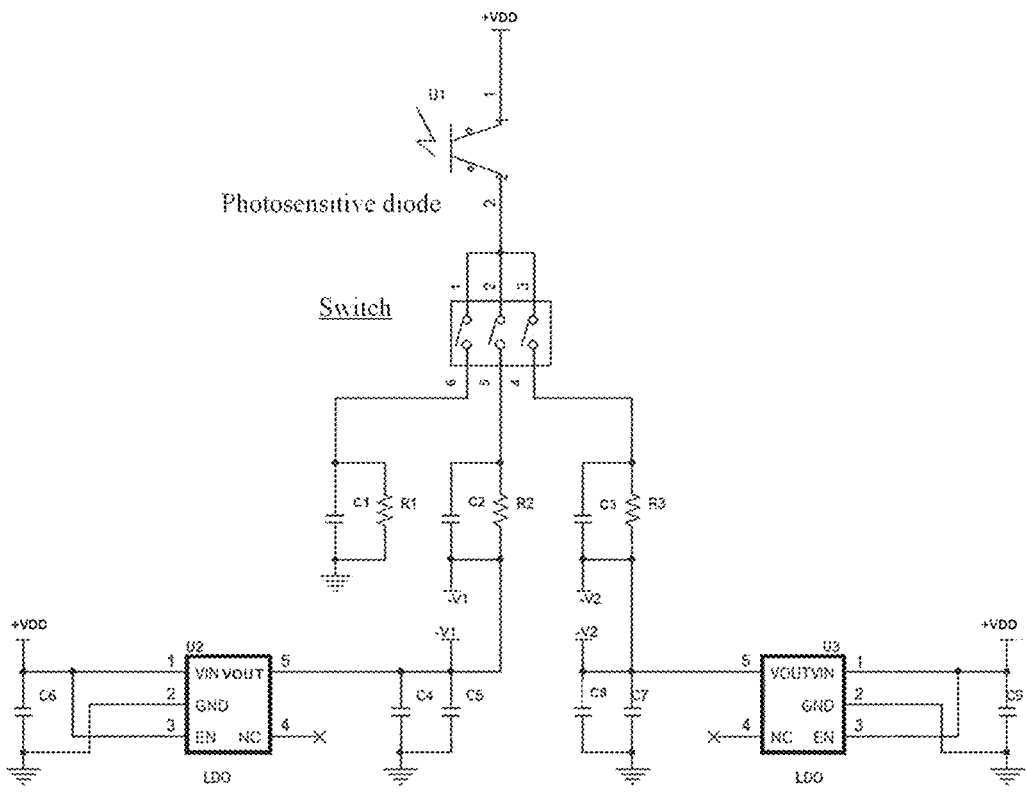

FIG. 1

| Select a target detection group from the at least two detection groups |
| --- |

| Control the switch to be connected to the target detection group |
| --- |

| Perform voltage detection on the target detection group, and perform analog-digital conversion on a voltage detection result to obtain a digital voltage |
| --- |

| Determine a brightness detection result based on the digital voltage |
| --- |

FIG. 2

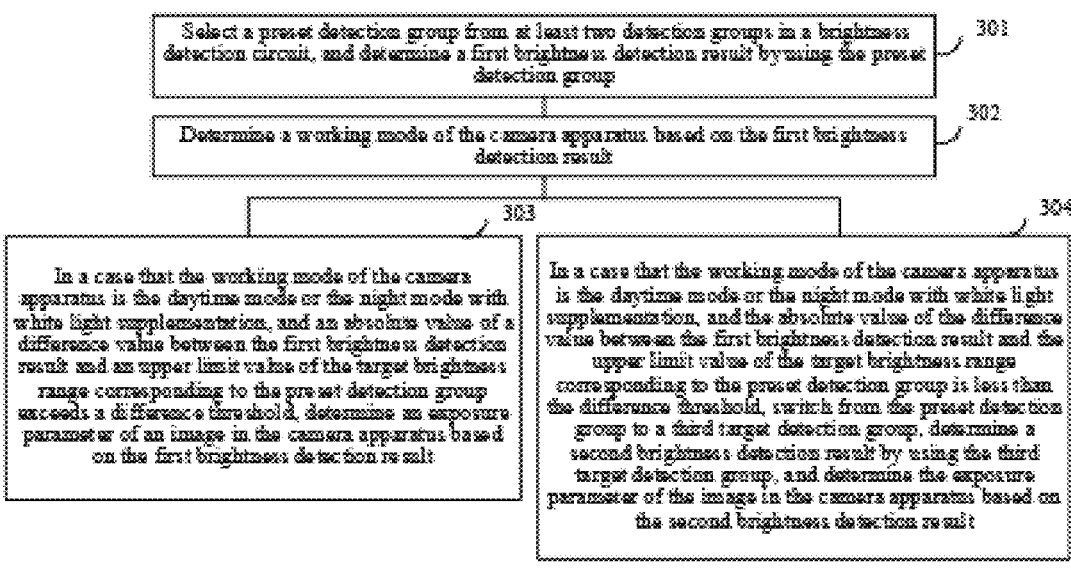

Select a preset detection group from at least two detection groups in a brightness detection circuit, and determine a first brightness detection result by using the preset detection group ⟋ 301

Determine a working mode of the camera apparatus based on the first brightness detection result ⟋ 302

303

In a case that the working mode of the camera apparatus is the daytime mode or the night mode with white light supplementation, and an absolute value of a difference value between the first brightness detection result and an upper limit value of the target brightness range corresponding to the preset detection group exceeds a difference threshold, determine an exposure parameter of an image in the camera apparatus based on the first brightness detection result

304

In a case that the working mode of the camera apparatus is the daytime mode or the night mode with white light supplementation, and the absolute value of the difference value between the first brightness detection result and the upper limit value of the target brightness range corresponding to the preset detection group is less than the difference threshold, switch from the preset detection group to a third target detection group, determine a second brightness detection result by using the third target detection group, and determine the exposure parameter of the image in the camera apparatus based on the second brightness detection result

FIG. 3

PIR awakens an MCU when detecting a person passing by ⟋ 401

The MCU selects a detection group 1 from the three detection groups of the brightness detection circuit, and obtains a brightness detection result "X1" based on the detection group 1 ⟋ 402

The MCU determines a working mode of the camera apparatus according to a comparison result of the brightness detection result "X1" and a brightness threshold ⟋ 403

Yes

In a case that "X1" is less than a first brightness threshold, the MCU sets the working mode of the camera apparatus as a night mode ⟋ 404

No ⟋ 405

In a case that "X1" is greater than or equal to a second brightness threshold, the MCU sets the working mode of the camera apparatus as a daytime mode The MCU determines whether the brightness detection result "X1" is matched with the brightness range of the detection group 1 or no ⟋ 406

Yes

The MCU lookups in a mapping relationship between a brightness value and an exposure parameter according to the brightness detection result "X1" so as to obtain a first exposure parameter of a first frame image in the camera apparatus ⟋ 407

No

The MCU selects a detection group 2 from the three detection groups of the brightness detection circuit, and obtains a brightness detection result "X2" based on the detection group 2 ⟋ 408

The MCU determines whether the brightness detection result "X2" is matched with the brightness range of the detection group 2 or not ⟋ 409

Yes

The MCU lookups in the mapping relationship between the brightness value and the exposure parameter according to the brightness detection result "X2" so as to obtain a second exposure parameter of the first frame image in the camera apparatus ⟋ 410

No

The MCU selects a detection group 3 from the three detection groups of the brightness detection circuit, and obtains a brightness detection result "X3" based on the detection group 3 ⟋ 411

FIG. 4

BRIGHTNESS DETECTION METHOD AND APPARATUS, CONTROL METHOD AND APPARATUS FOR PHOTOGRAPHIC APPARATUS, AND MEDIUM

CROSS-REFERENCE TO RELATED APPLICATIONS

The present application is a National Stage Entry of International application No. PCT/CN2023/116558 filed on Sep. 1, 2023, which based on and claims priority to Chinese Patent Application No. 202211075503.6 filed on Sep. 5, 2022, and entitled "BRIGHTNESS DETECTION METHOD AND APPARATUS, CONTROL METHOD AND APPARATUS FOR PHOTOGRAPHIC APPARA-TUS, AND MEDIUM", the disclosure of which is incorporated herein in its entirety.

TECHNICAL FIELD

The present application relates to the technical field of image acquisition, and in particular, to a brightness detection method and apparatus, a control method and apparatus for a photographic apparatus, and a medium.

BACKGROUND

A photographic apparatus usually needs to work at night. However, there is no natural light at night. Therefore, it is difficult for the photographic apparatus to obtain a clear image. In this case, an infrared light source may be added to cooperate with the photographic apparatus. To obtain a good image under both the natural light source and the infrared light source, a working mode of the photographic apparatus may be controlled based on an ambient brightness. For example, under a condition of a low ambient brightness, the working mode is set as a night mode. For another example, under a condition of a normal ambient brightness, the working mode is set as a daytime mode.

According to a current brightness detection method, a photosensitive diode is usually provided on a surface of the photographic apparatus, and the ambient brightness is detected by the photosensitive diode.

There are many types of photosensitive diodes in actual application. Some can meet a preset brightness range (for example, a brightness range of [0,1000] lux) requirement, and some can meet a preset precision requirement (for example, a precision requirement in some brightness ranges of 0.1 lux), where lux is a unit of luminance. However, at present, there is no photosensitive diode that can meet both the preset precision requirement and the preset brightness range requirement, that is, the current brightness detection method cannot meet both the preset precision requirement and the preset brightness range requirement.

SUMMARY

Embodiments of the present application provide a brightness detection method, to meet both a preset precision requirement and a preset brightness range requirement while reducing brightness detection costs.

Correspondingly, embodiments of the present application further provide a brightness detection apparatus, a control method for a photographic apparatus, a control apparatus for the photographic apparatus, an electronic device, and a machine-readable medium, to ensure implementation and application of the foregoing method.

To solve the problems, embodiments of the present application disclose a brightness detection method. A brightness detection circuit is used to perform brightness detection in the method. The brightness detection circuit includes: a photosensitive diode, a switch and at least two detection groups. The switch is connected to the photosensitive diode. The detection group includes: a sampling resistor and a capacitor connected in parallel. The at least two detection groups have corresponding brightness ranges obtained by dividing a preset brightness range. The method includes:

selecting a target detection group from the at least two detection groups;

controlling the switch to be connected to the target detection group;

performing voltage detection on the target detection group, and performing analog-digital conversion on a voltage detection result to obtain a digital voltage; wherein the analog-digital conversion corresponds to a number N of sampling points; wherein the at least two detection groups include: a preset detection group, the preset detection group corresponds to a target bright-ness range, and a ratio of a brightness span value corresponding to the target brightness range to the number N of the sampling points meets a preset pre-cision requirement; and wherein N digital voltages are used to represent a brightness value corresponding to the target brightness range, and a detection precision of the target brightness range is the ratio of the brightness span value to the number N of the sampling points; and determining a brightness detection result based on the digital voltage.

To solve the problems, embodiments of the present application disclose a control method for a photographic appa-ratus. The method includes:

selecting a preset detection group from at least two detection groups in a brightness detection circuit, and determining a first brightness detection result by using the preset detection group; wherein the preset detection group corresponds to a target brightness range; wherein a ratio of a brightness span value corresponding to the target brightness range to a number N of sampling points meets a preset precision requirement; and wherein N digital voltages are used to represent a brightness value corresponding to the target brightness range, and a detection precision of the target brightness range is the ratio of the brightness span value to the number N of the sampling points;

determining a working mode of the photographic appa-ratus based on the first brightness detection result; wherein the working mode includes: a daytime mode or a night mode; wherein the night mode including: a night mode with white light supplementation or a night mode without white light supplementation; and in a case that the working mode of the photographic apparatus is the daytime mode or the night mode with white light supplementation, and an absolute value of a difference value between the first brightness detection result and an upper limit value of the target brightness range corresponding to the preset detection group exceeds a difference threshold, determining an expo-sure parameter of an image in the photographic appa-ratus based on the first brightness detection result; or in a case that the working mode of the photographic apparatus is the daytime mode or the night mode with white light supplementation, and the absolute value of the difference value between the first brightness detec-tion result and the upper limit value of the target brightness range corresponding to the preset detection group is less than the difference threshold, switching from the preset detection group to a third target detection group, determining a second brightness detection result by using the third target detection group, and determining the exposure parameter of the image in the photographic apparatus based on the second brightness detection result.

The brightness detection circuit includes: a photosensitive diode, a switch and at least two detection groups. The switch is connected to the photosensitive diode. The detection group includes: a sampling resistor and a capacitor connected in parallel. The at least two detection groups have corresponding brightness ranges obtained by dividing a preset brightness range. The determining the first brightness detection result by using the preset detection group, or the determining the second brightness detection result by using the third target detection group includes: performing voltage detection on the preset detection result or the third target detection group, and performing analog-digital conversion on an obtained voltage detection result to obtain a digital voltage; and determining the first brightness detection result or the second brightness detection result based on the digital voltage.

In some embodiments, the method further includes:

in a case that an absolute value of a difference value between the second brightness detection result and an upper limit value of a brightness range corresponding to the third target detection group is less than the difference threshold, switching from the third target detection group to a fourth target detection group, determining a third brightness detection result by using the fourth target detection group, and determining the exposure parameter of the image in the photographic apparatus based on the third brightness detection result.

To solve the problems, embodiments of the present application disclose a brightness detection apparatus. The apparatus performs brightness detection by using a brightness detection circuit. The brightness detection circuit includes: a photosensitive diode, a switch and at least two detection groups. The switch is connected to the photosensitive diode. The detection group includes: a sampling resistor and a capacitor connected in parallel. The at least two detection groups have corresponding brightness ranges obtained by dividing a preset brightness range. The apparatus includes:

a selection module, configured to select a target detection group from the at least two detection groups;

a control module, configured to control the switch to be connected to the target detection group;

a voltage processing module, configured to perform voltage detection on the target detection group, and perform analog-digital conversion on a voltage detection result to obtain a digital voltage; wherein the analog-digital conversion corresponds to a number N of sampling points; wherein the at least two detection groups include: a preset detection group, the preset detection group corresponds to a target brightness range, and a ratio of a brightness span value corresponding to the target brightness range to the number N of the sampling points meets a preset precision requirement, and wherein N digital voltages are used to represent a brightness value corresponding to the target brightness range, and a detection precision of the target brightness range is the ratio of the brightness span value to the number N of the sampling points; and a result determination module, configured to determine a brightness detection result based on the digital voltage.

In some embodiments, the selection module includes:

a detection group selection module, configured to select one target detection group from the at least two detection groups as a first target detection group; and a detection group switching module, configured to: in a case that an absolute value of a difference value between a brightness detection result corresponding to the first target detection group and an upper limit value or a lower limit value of a brightness range corresponding to the first target detection group is less than a difference threshold, switch from the first target detection group into a second target detection group, wherein a lower limit value of a brightness range corresponding to the second target detection group is matched with the upper limit value of the brightness range corresponding to the first target detection group, or an upper limit value of the brightness range corresponding to the second target detection group is matched with the lower limit value of the brightness range corresponding to the first target detection group.

In some embodiments, the detection group selection module includes:

a ranking selection module, configured to: in a case that a control unit is awakened, based on a ranking result of lower limit values or upper limit values of brightness ranges corresponding to the at least two detection groups, select one target detection group from the at least two detection groups as the first target detection group.

In some embodiments, the result determination module includes:

a sampling current value determination module, configured to: determine a sampling current value of the brightness detection circuit based on the digital voltage; and a brightness detection result determination module, configured to: determine the brightness detection result corresponding to the sampling current value based on a mapping relationship between a current value and a brightness value.

In some embodiments, a resistance value of the sampling resistor in the detection group is determined based on brightness range corresponding to the detection group, the mapping relationship between the current value and the brightness value, a standard voltage corresponding to the photosensitive diode and the Ohm's law.

To solve the problems, embodiments of the present application disclose a control apparatus for a photographic apparatus. The apparatus includes: a first brightness detection module, a working mode determination module, a first exposure parameter determination module and/or a second exposure parameter determination module.

The first brightness detection module is configured to select a preset detection group from at least two detection groups in a brightness detection circuit, and determine a first brightness detection result by using the preset detection group. The preset detection group corresponds to a target brightness range. A ratio of a brightness span value corresponding to the target brightness range to a number N of sampling points meets a preset precision requirement. N digital voltages are used to represent a brightness value corresponding to the target brightness range, and a detection precision of the target brightness range is the ratio of the brightness span value to the number N of the sampling points.

The working mode determination module is configured to determine a working mode of the photographic apparatus based on the first brightness detection result. The working mode includes: a daytime mode or a night mode. The night mode includes: a night mode with white light supplementation or a night mode without white light supplementation.

The first exposure parameter determination module is configured to: in a case that the working mode of the photographic apparatus is the daytime mode or the night mode with white light supplementation, and an absolute value of a difference value between the first brightness detection result and an upper limit value of the target brightness range corresponding to the preset detection group exceeds a difference threshold, determine an exposure parameter of an image in the photographic apparatus based on the first brightness detection result.

The second exposure parameter determination module is configured to: in a case that the working mode of the photographic apparatus is the daytime mode or the night mode with white light supplementation, and the absolute value of the difference value between the first brightness detection result and the upper limit value of the target brightness range corresponding to the preset detection group is less than the difference threshold, switch from the preset detection group to a third target detection group, determine a second brightness detection result by using the third target detection group, and determine the exposure parameter of the image in the photographic apparatus based on the second brightness detection result.

The brightness detection circuit includes: a photosensitive diode, a switch and at least two detection groups. The switch is connected to the photosensitive diode. The detection group includes: a sampling resistor and a capacitor connected in parallel. The at least two detection groups have corresponding brightness ranges obtained by dividing a preset brightness range. The determining the first brightness detection result by using the preset detection group, or the determining the second brightness detection result by using the third target detection group includes: performing voltage detection on the preset detection group or the third target detection group, and performing analog-digital conversion on an obtained voltage detection result to obtain a digital voltage; and determining the first brightness detection result or the second brightness detection result based on the digital voltage.

In some embodiments, the apparatus further includes:

a third exposure parameter determination module, configured to: in a case that an absolute value of a difference value between the second brightness detection result and an upper limit value of a brightness range corresponding to the third target detection group is less than the difference threshold, switch from the third target detection group to a fourth target detection group, determining a third brightness detection result by using the fourth target detection group, and determine the exposure parameter of the image in the photographic apparatus based on the third brightness detection result. The preset detection group, the third target detection group and the fourth target detection group form a brightness measurement range interval, a brightness lower limit value of a previous detection group is equal to a brightness upper limit value of a subsequent detection group, or each detection group has a same brightness lower limit value.

Embodiments of the present application further disclose an electronic device, including: a processor; and a memory, having stored thereon an executable code, which, when executed, cause the processor to perform the method according to the embodiments of the present application.

Embodiments of the present application further disclose a machine-readable medium, having stored thereon an executable code, which, when executed, cause a processor to perform the method according to the embodiments of the present application.

Embodiments of the present application further disclose a computer program product, having stored thereon an executable code, which, when executed, cause a processor to perform the method according to the embodiments of the present application.

Embodiments of the present application further provide the following processing procedure for obtaining a brightness detection result by using a brightness detection circuit: selecting a target detection group from at least two detection groups; controlling a switch to be connected to the target detection group; performing voltage detection on the target detection group, and performing analog-digital conversion on a voltage detection result to obtain a digital voltage; and determining a brightness detection result based on the digital voltage. The brightness detection result obtained by the embodiments of the present application can meet both the preset precision requirement and the preset brightness range requirement, so the brightness detection result can be applied to a control procedure of the photographic apparatus.

Furthermore, the brightness detection circuit of the embodiments of the present application includes: a photosensitive diode, a switch, a sampling resistor, a capacitor and other electronic devices. The sampling resistor may be a universal resistor. All these electronic devices have the characteristic of low cost, so the embodiments of the present application can meet both the preset precision requirement and the present brightness range requirement while reducing the brightness detection cost.

BRIEF DESCRIPTION OF THE DRAWINGS

FIG. 1 is a schematic structural diagram of a brightness detection circuit according to an embodiment of the present application;

FIG. 2 is a schematic flowchart of steps of a brightness detection method according to an embodiment of the present application;

FIG. 3 is a schematic flowchart of steps of a control method for a photographic apparatus according to an embodiment of the present application;

FIG. 4 is a schematic flowchart of steps of a control method for a photographic apparatus according to an embodiment of the present application;

DETAILED DESCRIPTION

Figure 5:
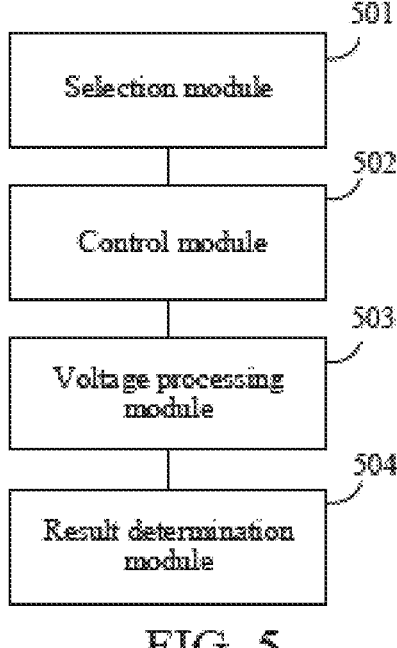
FIG. 5 is a schematic structural diagram of a brightness detection apparatus according to an embodiment of the present application.

To make the foregoing objectives, features, and advantages of the present application clearer and easier to understand, the present application is further described in detail with reference to the accompanying drawings and specific implementations.

Embodiments of the present application can be applied to the field of image acquisition, and are used for providing brightness information meeting both a preset precision requirement and a preset brightness range requirement for a photographic apparatus. The photographic apparatus may include: a photographic apparatus with low power consumption and powered by a battery. Certainly, the photographic apparatus may alternatively include: a photographic apparatus powered by a power supply, or a photographic apparatus powered by POE (Power Over Ethernet). It may be understood that the embodiments of the present application do not limit a specific photographic apparatus.

The photographic apparatus with low power consumption is a camera device powered by a battery and capable of providing users with long-term environmental change detection. The photographic apparatus with low power consumption may include: an image sensor, a CPU, an MCU (Microcontroller Unit), a PIR (Passive infrared detectors) and other devices. To prolong a battery life, the image sensor and the CPU of the photographic apparatus with low power consumption may be in a power-off mode, and the MCU of the photographic apparatus with low consumption may be in a sleep mode. The PIR can start the photographic apparatus with low power consumption when detecting a person passing by.

A starting procedure of the photographic apparatus with low power consumption may specifically include: awakening the MCU, and powering on the image sensor and the CPU by the MCU. The MCU may control a working mode of the photographic apparatus with low power consumption based on an ambient brightness. For example, under a condition of a low ambient brightness, the working mode is set as a night mode. For another example, under a condition of a normal ambient brightness, the working mode is set as a daytime mode.

According to a current brightness detection method, a photosensitive diode is usually arranged on a surface of the photographic apparatus, and the ambient brightness is detected by the photosensitive diode. However, at present, there is no photosensitive diode that can meet both the preset precision requirement and the preset brightness range requirement, that is, the current brightness detection method cannot meet both the preset precision requirement and the preset brightness range requirement.

In view of the technical problem that the current brightness detection method cannot meet both the preset precision requirement and the preset brightness range requirement, embodiments of the present application disclose a brightness detection method. The method utilizes a brightness detection circuit for brightness detection. The brightness detection circuit may specifically include: a photosensitive diode, a switch, and at least two detection groups. The switch is connected to the photosensitive diode. The detection group may specifically include: a sampling resistor and a capacitor connected in parallel. The at least two detection groups have corresponding brightness ranges obtained by dividing a preset brightness range.

The method may specifically include: selecting a target detection group from the at least two detection groups; controlling the switch to be connected to the target detection group; performing voltage detection on the target detection group, and performing analog-digital conversion on a voltage detection result to obtain a digital voltage; wherein the analog-digital conversion may correspond to a number N of sampling points; wherein the at least two detection groups may specifically include a preset detection group, the preset detection group corresponds to a target brightness range, and a ratio of a brightness span value corresponding to the target brightness range to the number N of the sampling points meets a preset precision requirement; and wherein N digital voltages are used to represent a brightness value corresponding to the target brightness range, and a detection precision of the target brightness range is the ratio of the brightness span value to the number N of the sampling points; and determining a brightness detection result based on the digital voltage.

The embodiments of the present application include the following advantages:

In the embodiments of the present application, a brightness detection circuit is used to perform brightness detection. The brightness detection circuit includes at least two detection groups. On one hand, the brightness ranges respectively corresponding to the at least two detection groups are obtained by dividing a preset brightness range, so that a union set of the brightness ranges respectively corresponding to the at least two detection groups can meet the preset brightness range requirement. On the other hand, the at least two detection groups may specifically include a preset detection group, wherein the preset detection group corresponds to a target brightness range, and a ratio of the target brightness range to a number of sampling points meets the preset precision requirement. Since the ratio of the target brightness range to the number of the sampling points may represent a detection precision of the target brightness range, when the ratio meets the preset precision requirement, the detection precision of the target brightness range can meet the preset precision requirement.

Assuming that the preset brightness range is [0,1000] lux, two or more detection groups may be provided in the brightness detection circuit. Brightness ranges respectively corresponding to two detection groups may be: [0,10] lux, [10,1000] lux or the like. Brightness ranges respectively corresponding to three detection groups may be: [0,10] lux, [10,100] lux, [100,1000] lux or the like. Brightness ranges respectively corresponding to four detection groups may be: [0,10] lux, [10,100] lux, [100,500] lux, [500,1000] lux or the like. It may be understood that a quantity of the detection groups may be more than four.

The preset detection group is provided in the brightness detection circuit according to the embodiments of the present application. The ratio of the target brightness range corresponding to the preset detection group to the number of the sampling points meets the preset precision requirement, so that the detection precision of the target brightness range can meet the preset precision requirement. For example, the target brightness range corresponding to the preset detection group is [0,10] lux. It is assumed that the sampling point is 2 to the $n^{th}$ (n may be the number of binary bits of the digital voltage) power. In a case that n is 10, the ratio of the target brightness range to the number of the sampling points is less than 0.01, and the precision requirement of 0.1 lux in some brightness ranges in the actual application can be met. It may be understood that a person skilled in the art can divide the preset brightness range based on an actual application requirement so as to obtain the brightness ranges respectively corresponding to the preset detection group and other detection groups. The embodiments of the present application do not limit specific detection groups and specific brightness ranges corresponding to detection groups.

Embodiments of the present application further provide the following processing procedure for obtaining the brightness detection result by using the brightness detection circuit: selecting a target detection group from the at least two detection groups; controlling the switch to be connected to the target detection group; performing voltage detection on the target detection group, and performing analog-digital conversion on the voltage detection result to obtain the digital voltage; and determining the brightness detection result based on the digital voltage. The brightness detection result obtained in the embodiments of the present application can meet both the preset precision requirement and the preset brightness range requirement, so that the brightness detection result can be applied to a control procedure of the photographic apparatus.

The brightness detection circuit in the embodiments of the present application includes: a photosensitive diode, a switch, a sampling resistor, a capacitor, and other electronic devices. The sampling resistor may be a universal resistor. All these electronic devices have a characteristic of low costs, so the embodiments of the present application can meet both the preset precision requirement and the preset brightness range requirement while reducing costs of brightness detection.

The photographic apparatus according to the embodiments of the present application may be a photographic apparatus with low power consumption which is powered by a battery. A brightness detection result is required for a first frame image captured after the photographic apparatus with low power consumption is started (a control unit of the photographic apparatus with low power consumption is awakened). Specifically, in an embodiment of the present application, an exposure parameter of the first frame image can be determined based on the brightness detection result, and the first frame image can be captured based on the exposure parameter of the first frame image. The control unit of the photographic apparatus with low power consumption may be: an MCU, a CPU, or other chips with a processing function.

Method Embodiment 1

In this embodiment, a brightness detection circuit will be explained first.

Referring to FIG. 1, which illustrates a schematic structural diagram of a brightness detection circuit according to an embodiment of the present application. The brightness detection circuit may specifically include: a photosensitive diode, a switch, and three detection groups. The switch is connected to the photosensitive diode. The detection group may specifically include: a sampling resistor and a capacitor connected in parallel. For example, a detection group 1 may include: a sampling resistor R1 and a capacitor C1 connected in parallel. A detection group 2 may include: a sampling resistor R2 and a capacitor C2 connected in parallel. A detection group 3 may include: a sampling resistor R3 and a capacitor C3 connected in parallel.

A person skilled in the art can divide a preset brightness range based on an actual application requirement so as to obtain brightness ranges respectively corresponding to at least two detection groups. For example, brightness ranges respectively corresponding to three detection groups are: [0,A] lux, [A,B] lux, [B,C] lux, or the like. "−V1" in FIG. 1 may provide a voltage for a negative electrode of the detection group 2, and "−V2" in FIG. 1 may provide a voltage for a negative electrode of the detection group 3.

The specific values of the preset brightness range, A, B and C may be determined by a person skilled in the art based on the actual application requirement. For example, the preset brightness range may be [0,1000] lux, A may be 10, B may be 100, C may be 1000, or the like.

It should be noted that in a case a detection port of the photographic apparatus is provided with an attenuation film, the preset brightness range can be adjusted according to an attenuation rate β of the attenuation film, and an adjusted preset brightness range may be: [0,1000]/β lux. The detection port of the photographic apparatus may further be provided with a light guide column, and the light guide column can enlarge an angle of light receiving to achieve light collection. Generally, the light guide column and the attenuation film are fixed before and after. The at least two detection groups may include a preset detection group. The preset detection group may be configured to meet the preset precision requirement. In actual application, a target brightness range of the preset detection group can be determined based on a brightness range having the preset precision requirement. It may be understood that the brightness range having the preset precision requirement may be a subset or a full set of the target brightness range of the preset detection group.

Referring to FIG. 2, which illustrates a schematic flowchart of steps of a brightness detection method according to an embodiment of the present application. The method may utilize a brightness detection circuit for brightness detection. The brightness detection circuit may specifically include: a photosensitive diode, a switch, and at least two detection groups. The switch is connected to the photosensitive diode. The detection group may specifically include: a sampling resistor and a capacitor connected in parallel. The at least two detection groups have corresponding brightness ranges obtained by dividing a preset brightness range. The method may specifically include the following steps:

Step 201: selecting a target detection group from the at least two detection groups;

Step 202: controlling the switch to be connected to the target detection group;

Step 203: performing voltage detection on the target detection group, and performing analog-digital conversion on a voltage detection result to obtain a digital voltage; wherein the analog-digital conversion may correspond to a number N of sampling points; wherein the at least two detection groups may specifically include a preset detection group, the preset detection group corresponds to a target brightness range, and a ratio of a brightness span value corresponding to the target brightness range to the number N of the sampling points meets a preset precision requirement; wherein N digital voltages are used to represent a brightness value corresponding to the target brightness range, and a detection precision of the target brightness range is the ratio of the brightness span value to the number N of the sampling points; and wherein the brightness span value may be a difference value between an upper limit value and a lower limit value of the target brightness range; and Step 204: determining a brightness detection result based on the digital voltage.

The method shown in FIG. 2 may be used for obtaining the brightness detection result by utilizing the brightness detection circuit. The steps included in the method shown in FIG. 2 may be performed by the brightness detection apparatus. The brightness detection apparatus may be located inside or outside the photographic apparatus. For example, the brightness detection apparatus may be located inside a control unit (such as an MCU) of the photographic apparatus. It may be understood that the embodiments of the present application do not limit a specific subject of performing the steps included in the method shown in FIG. 2.

In step 201, a target detection group may be selected from the at least two detection groups, and the selected target detection group is configured to be connected to the switch.

In this embodiment of the present application, the target detection group may be selected from the at least two detection groups. For example, the target detection group may be randomly selected from the at least two detection groups. For another example, in a case that the control unit (such as the MCU) is awakened, one detection group may be selected from the at least two detection groups based on a ranking result of lower limit values or upper limit values of the brightness ranges corresponding to the at least two detection groups as the target detection group.

In this embodiment of the present application, the at least two detection groups may be ranked based on the lower limit values or the upper limit values of the brightness ranges corresponding to the at least two detection groups. For example, the at least two detection groups may be ranked in ascending or descending order based on the lower limit values or the upper limit values. Further, in this embodiment of the present application, a detection group ranking first or last may be selected as the target detection group. In other words, in this embodiment of the present application, a detection group with a smallest or largest lower limit value may be selected as the target detection group. Assuming that brightness ranges corresponding to three detection groups are respectively: a detection group 1 [0,10] lux, a detection group 2 [10,100] lux, and a detection group 3 [100,1000] lux, the detection group 1 [0,10] lux may be selected from the three detection groups as the target detection group, or the detection group 3 [100,1000] lux may be selected from the three detection groups as the target detection group.

In step 202, a control instruction may be sent to the switch, and the control instruction is used to control the switch to be connected to the target detection group.

In step 203, a voltage detection may be performed on a positive electrode voltage of the sampling resistor in the target detection group to obtain the voltage detection result. Further, analog-digital conversion may be performed on the voltage detection result to obtain the digital voltage.

The analog-digital conversion may be a mapping from the voltage detection result to the digital voltage. A range of the digital voltage may be determined based on the number of sampling points. For example, the number of sampling points is 2 to the $n^{th}$ power. For example, in a case that n=10, the range of the digital voltage may be [1,1024]. A range of the voltage detection result may be determined based on a standard voltage of the photosensitive diode. For example, in a case that a maximum voltage of the photosensitive diode is mV, the range of the voltage detection result may be [0,m]. Therefore, in this embodiment of the present application, the voltage detection result in the range of [0,m] may be mapped to 1024 values.

In step 204, the brightness detection result may be determined based on the digital voltage. Specifically, a sampling current value of the brightness detection circuit may be determined based on the digital voltage; and the brightness detection result corresponding to the sampling current value may be determined based on a mapping relationship between a current value and a brightness value. According to the Ohm's law: I=U÷R, the sampling current value of the brightness detection circuit may be determined. Further, based on the sampling current value, lookup may be performed in the mapping relationship between the current value and the brightness value to obtain the brightness detection result corresponding to the sampling current value. The brightness detection result may be a target brightness value.

In actual application, the mapping relationship between the current value and the brightness value may be estab-lished for the photosensitive diode. For example, the corresponding current value and brightness value may be detected under a condition of a standard voltage of the photosensitive diode and a preset sampling resistor, so that the mapping relationship between the current value and the brightness value can be established based on the detection result of the current value and the brightness value. It may be understood that this embodiment of the present application does not limit a specific establishing process of the mapping relation-ship between the current value and the brightness value.

The principle of performing brightness detection using the brightness detection circuit in this embodiment of the pres-ent application may be:

The photosensitive diode generates a photocurrent Ia based on an external light source, a magnitude of voltage across the sampling resistor R is Vr=Ia*R, and a voltage across the capacitor C is charged to a value of Vr. The positive electrode voltage of the sampling resistor is detected by using a single-chip microcomputer or other detection modes, and the analog-digital conversion is per-formed on the voltage detection result to obtain the digital voltage. In a case that the external light source changes, the photocurrent Ia also changes accordingly, and the corre-sponding voltage detection result and digital voltage also change.

In an optional embodiment of the present application, the process of selecting a target detection group from the at least two detection groups may specifically include: selecting one detection group from the at least two detection groups as a first target detection group; and in a case that an absolute value of a difference value between a brightness detection result corresponding to the first target detection group and an upper limit value or a lower limit value of a brightness range corresponding to the first target detection group is less than a difference threshold, switching the first target detection group to a second target detection group. A lower limit value of a brightness range corresponding to the second target detection group is matched with the upper limit value of the brightness range corresponding to the first target detection group, or an upper limit value of the brightness range corresponding to the second target detection group is matched with the lower limit value of the brightness range corresponding to the first target detection group.

According to this embodiment of the present application, first, the first target detection group may be selected from the at least two detection groups. For example, the first target detection group may be randomly selected from the at least two detection groups. For another example, in a case that the control unit (such as the MCU) is awakened, one detection group may be selected from the at least two detection groups based on the ranking result of the lower limit values or the upper limit values of the brightness ranges corresponding to the at least two detection groups as the first target detection group.

According to this embodiment of the present application, brightness detection may be performed for the first target detection group to obtain the brightness detection result corresponding to the first target detection group.

Then, the absolute value of the difference value between the brightness detection result corresponding to the first target detection group and the upper limit value or the lower limit value of the brightness range corresponding to the first target detection group may be determined, and the absolute value of the difference value is compared with the difference threshold. In a case that the absolute value of the difference value is less than the difference threshold, it may indicate that the brightness range corresponding to the first target detection group is saturated, and the ambient brightness is to exceed the brightness range corresponding to the first target detection group, so it is necessary to switch from the first target detection group to the second target detection group. The difference threshold may be determined by a person skilled in the art based on an actual application requirement. For example, the difference threshold may be less than p lux, and p may be a positive integer.

The lower limit value of the brightness range corresponding to the second target detection group is matched with the upper limit value of the brightness range corresponding to the first target detection group, or the upper limit value of the brightness range corresponding to the second target detection group is matched with the lower limit value of the brightness range corresponding to the first target detection group.

Specifically, in a case that the absolute value of the difference value between the brightness detection result and the upper limit value of the brightness range corresponding to the first target detection group is less than the difference threshold, the lower limit value of the brightness range corresponding to the second target detection group is matched with the upper limit value of the brightness range corresponding to the first target detection group. Alternatively, in a case that the absolute value of the difference value between the brightness detection result and the lower limit value of the brightness range corresponding to the first target detection group is less than the difference threshold, the upper limit value of the brightness range corresponding to the second target detection group is matched with the lower limit value of the brightness range corresponding to the first target detection group.

It is assumed that three detection groups are respectively: a detection group 1 [0,10] lux, a detection group 2 [10,100] lux, and a detection group 3 [100,1000] lux. Assuming that the detection group 1 [0,10] lux is the first target detection group and assuming that an absolute value of a difference value between a brightness detection result corresponding to the detection group 1 [0,10] and an upper limit value 10 of the brightness range corresponding to the detection group 1 [0,10] lux is less than a difference threshold, it may be switched from the detection group 1 [0,10] lux to the detection group 2 [10,100] lux. Assuming that the detection group 3 [100,1000] lux is the first target detection group and assuming that an absolute value of a difference value between a brightness detection result corresponding to the detection group 3 [100,1000] and a lower limit value 100 of the brightness range corresponding to the detection group 3 [100,1000] lux is less than a difference threshold, it may be switched from the detection group 3 [100,1000] lux to the detection group 2 [10,100] lux.

In actual application, according to this embodiment of the present application, the target detection group may be self-adaptively switched based on a matching condition between the brightness range corresponding to the selected target detection group and the ambient brightness.

Specifically, in a case that the brightness range corresponding to the first target detection group is matched with the ambient brightness (that is, the absolute value of the difference value is greater than or equal to the difference threshold), the target detection group may not be switched. In a case that the brightness range corresponding to the first target detection group is saturated (that is, the absolute value of the difference value is less than the difference threshold), it may be switched from the first target detection group to the second target detection group.

Further, in a case that the brightness range corresponding to the second target detection group is matched with the ambient brightness (that is, the absolute value of the difference value is greater than or equal to the difference threshold), the target detection group may not be switched. In a case that the brightness range corresponding to the second target detection group is saturated (that is, the absolute value of the difference value is less than the difference threshold), it may be switched from the second target detection group to the third target detection group.

The process of determining a resistance value of the sampling resistor in the detection groups is described herein. The resistance value of the sampling resistor in the detection group is determined based on brightness ranges corresponding to the detection group, the mapping relationship between the current value and the brightness value, a standard voltage corresponding to the photosensitive diode, and the Ohm's law.

Specifically, the mapping relationship between the current value and the brightness value may include: a proportional relationship between the current value and the brightness value. Assuming that the proportional relationship is: a brightness value 1 lux corresponds to a current value X, and the current value X represents a current value corresponding to a brightness value of a unit; and a current range corresponding to the brightness range corresponding to the detection group may be: (the upper limit value–the lower limit value of the brightness range)/1*X; and further, a resistance value of the sampling resistor may be: a standard voltage/current range.

Assuming that the current value X is 0.5 uA and the standard voltage is 3 V, the sampling resistance RSS1 corresponding to the detection group 1 [0,10] lux is $3V/(10*0.5*10^\wedge-6)=6*10^\wedge5$, which is a resistance of 600K; the sampling resistance RSS2 corresponding to the detection group 2 [10,100] lux is $3V/(90*0.5*10^\wedge-6)\approx6.6*10^\wedge4$, which is a resistance of 66K; and the sampling resistance RSS3 corresponding to the detection group 3 [100,1000] lux is $3V/(900*0.5*10^\wedge-6)\approx6.6*10^\wedge3$, which is a resistance of 6.6K. It may be understood that the resistance of 600K, the resistance of 66K and the resistance of 6.6K are examples of the resistance values of the sampling resistors under a specific current value X, a specific standard voltage and a specific brightness range, those skilled in the art may use the sampling resistors with the required resistance values according to the actual application requirements, and the embodiments of the present application do not limit the specific resistance values of the sampling resistors.

In this embodiment of the present application, the detection group may represent any detection group in the brightness detection circuit. The preset detection group may be a detection group in the brightness detection circuit, in which the ratio of the target brightness range to the number of the sampling points meets the preset precision requirement. The target detection group may be a detection group in the brightness detection circuit, and the target detection group and the preset detection group may be the same or different. The first target detection group or the second target detection group may a subordinate implementation of the target detection group.

In conclusion, in the brightness detection method according to this embodiment of the present application, brightness detection is performed by the brightness detection circuit. The brightness detection circuit includes at least two detection groups. On one hand, the brightness ranges respectively corresponding to the at least two detection groups are obtained by dividing a preset brightness range, so a union set of the brightness ranges respectively corresponding to the at least two detection groups can meet the preset brightness range requirement. On the other hand, the at least two detection groups may specifically include a preset detection group, wherein the preset detection group corresponds to a target brightness range, and a ratio of the target brightness range to a number of sampling points meets a preset precision requirement. Since the ratio of the target brightness range to the number of the sampling points may represent a detection precision of the target brightness range, the ratio meeting the preset precision requirement makes the detection precision of the target brightness range meet the preset precision requirement.

This embodiment of the present application further provides the following processing procedure for obtaining a brightness detection by using the brightness detection circuit: selecting a target detection group from the at least two detection groups; controlling the switch to be connected to the target detection group; performing voltage detection on the target detection group, and performing analog-digital conversion on a voltage detection result to obtain a digital voltage; and determining a brightness detection result based on the digital voltage. The brightness detection result obtained by the embodiments of the present application can meet both the preset precision requirement and the preset brightness range requirement, so the brightness detection result can be applied to a control procedure of the photographic apparatus.

Method Embodiment 2

Referring to FIG. 3 which is a schematic flowchart of steps of a control method for a photographic apparatus according to an embodiment of the present application. The method may specifically include the following steps:

Step 301: selecting a preset detection group from at least two detection groups in a brightness detection circuit, and determining a first brightness detection result by using the preset detection group; wherein the preset detection group corresponds a target brightness range, for example, the lower limit value of the target brightness range is 0 lux, and the upper limit value of the target brightness range is A lux; a ratio of a brightness span value corresponding to the target brightness range to a number N of sampling points meets a preset precision requirement; and wherein N digital voltages are used to represent a brightness value corresponding to the target brightness range, a detection precision of the target brightness range is the ratio of the brightness span value to the number N of the sampling points;

Step 302: determining a working mode of the photographic apparatus based on the first brightness detection result, wherein the working mode may include: a daytime mode or a night mode; and the night mode includes: a night mode with white light supplementation or a night mode without white light supplementation;

Step 303: in a case that the working mode of the photographic apparatus is the daytime mode or the night mode with white light supplementation, and an absolute value of a difference value between the first brightness detection result and an upper limit value of the target brightness range corresponding to the preset detection group exceeds a difference threshold, determining an exposure parameter of an image in the photographic apparatus based on the first brightness detection result; or Step 304: in a case that the working mode of the photographic apparatus is the daytime mode or the night mode with white light supplementation, and the absolute value of the difference value between the first brightness detection result and the upper limit value of the target brightness range corresponding to the preset detection group is less than the difference threshold, switching from the preset detection group to a third target detection group, determining a second brightness detection result by using the third target detection group, and determining the exposure parameter of the image in the photographic apparatus based on the second brightness detection result; wherein for example, a lower limit value of a brightness range of the third target detection group is A lux, and an upper limit value of the brightness range of the third target detection group is B lux;

the brightness detection circuit includes: a photosensitive diode, a switch and at least two detection groups; the switch is connected to the photosensitive diode; the detection group includes: a sampling resistor and a capacitor connected in parallel; the at least two detection groups have corresponding brightness ranges obtained by dividing a preset brightness range; the photosensitive diode generates a photocurrent based on an external light source, a voltage magnitude across the sampling resistor is determined based on the photocurrent, and the capacitor is charged to the voltage magnitude; performing voltage detection on the preset detection group or the third target detection group, and performing analog-digital conversion on an obtained voltage detection result to obtain a digital voltage; and determining the first brightness detection result or the second brightness detection result based on the digital voltage.

According to this embodiment, the first brightness detection result may be determined by using the preset detection group in the brightness detection circuit, and the working mode of the photographic apparatus may be determined based on the first brightness detection result. The working mode of the photographic apparatus may include: a daytime mode or a night mode. In a case that the working mode of the photographic apparatus is the daytime mode or the night mode with white light supplementation, the second brightness detection result is determined, and an exposure parameter of an image (such as a first frame image) in the photographic apparatus is determined based on the second brightness detection result.

The steps included in the method shown in FIG. 3 may be performed by a control apparatus for the photographic apparatus. The control apparatus for the photographic apparatus may be located inside or outside the photographic apparatus. For example, the control apparatus for the photographic apparatus may be located inside a control unit (such as MCU) of the photographic apparatus. It may be understood that the embodiments of the present application do not limit the specific subject of performing the steps included in the method shown in FIG. 3.

In Step 301, the brightness detection apparatus may select the preset detection group from the at least two detection groups in the brightness detection circuit, and determine the first brightness detection result by using the preset detection group. The control apparatus for the photographic apparatus may receive the first brightness detection result from the brightness detection apparatus. The triggering condition of Step 301 may be: the photographic apparatus is started, for example, the control unit of the photographic apparatus is awakened.

In Step 302, a brightness threshold for mode detection may be preset. In a case that a brightness value corresponding to the first brightness detection result is less than the brightness threshold, the working mode of the photographic apparatus may be set as a night mode without white light supplementation; or in a case that the brightness value corresponding to the first brightness detection result is greater than or equal to the brightness threshold, the working mode of the photographic apparatus may be set as the daytime mode or the night mode with white light supplementation.

It should be noted that the brightness threshold may include: a first brightness threshold and a second brightness threshold. In a case that the brightness value corresponding to the brightness detection result is less than the first brightness threshold, the working mode of the photographic apparatus may be set as the night mode without white light supplementation; or in a case that the brightness value corresponding to the brightness detection result is greater than or equal to the second brightness threshold, the working mode of the photographic apparatus may be set as the daytime mode or the night mode with white light supplementation. The brightness threshold may be determined by those skilled in the art based on the actual application requirement. For example, the range of the first brightness threshold may be [0.5-1] lux, and the range of the second brightness range may be [2-5] lux.

One difference between the daytime mode and the night mode is: working modes of a filter are different. In the daytime mode, the filter is required to be switched to a mode of cutting off infrared light so as to prevent color cast of an image caused by the entry of the infrared light; and in the night mode, the filter is required to be switched to a infrared-sensitive black-and-white mode, so that a better low-luminance effect can appear at night. In actual application, a dual-filter switcher may be used for switching the working modes of the filter. Specifically, the dual-filter switcher may be an infrared camera accessory that allow the filter to be switched to a non-infrared-sensitive filter in the daytime mode and to an infrared-sensitive filter in the night mode.

According to the embodiments of the present application, in a case that the working mode of the photographic apparatus is the daytime mode, the exposure parameter of the first frame image in the photographic apparatus may be determined based on the brightness detection result.

In one implementation manner, in a case that the working mode of the photographic apparatus is the daytime mode, and the absolute value of the difference value between the first brightness detection result and the upper limit value of the target brightness range corresponding to the preset detection group exceeds the difference threshold, the exposure parameter of the first frame image in the photographic apparatus is determined based on the first brightness detection result.

In another implementation manner, in a case that the working mode of the photographic apparatus is the daytime mode, and the absolute value of the difference value between the first brightness detection result and the upper limit value of the target brightness range corresponding to the preset detection group is less than the difference threshold, it is switched from the preset detection group to the third target detection group, the second brightness detection result is determined by using the third target detection group, and the exposure parameter of the first frame image in the photographic apparatus is determined based on the second brightness detection result.

It should be noted that the method according to this embodiment may further include: in a case that an absolute value of a difference value between the second brightness detection result and an upper limit value of a brightness range corresponding to the third target detection group is less than a difference threshold, switching from the third target detection group to a fourth target detection group, determining a third brightness detection result by using the fourth target detection group, and determining the exposure parameter of the first frame image in the photographic apparatus based on the third brightness detection result. A lower limit value of a brightness range of the fourth target detection group is B lux, and an upper limit value of the brightness range of the fourth target detection group is C lux. The preset detection group, the third target detection group and the fourth target detection group form a brightness measurement range interval, a brightness lower limit value of a previous detection group is equal to a brightness upper limit value of a subsequent detection group, or each detection group has a same brightness lower limit value. For example, the brightness range of the preset detection group is 0-A lux, the brightness range of the third target detection group is A-B lux, and the brightness range of the fourth target detection group is B-C lux. Or the brightness range of the preset target detection group is 0-A lux, the brightness range of the third target detection group is 0-B lux, and the brightness range of the fourth target detection group is 0-C lux.

It may be understood that in a case that an absolute value of a difference value between the third brightness detection result and an upper limit value of the brightness range corresponding to the fourth target detection group is less than a difference threshold, it is switched from the fourth target detection group to a fifth target detection group, a fourth brightness detection result is determined by using the fifth target detection group, and the exposure parameter of the first frame image in the photographic apparatus is determined based on the fourth brightness detection result. A lower limit value of a brightness range of the fifth target detection group is C lux, and an upper limit value of the brightness range of the fifth target detection group is D lux. A, B, C and D may all be positive integers, and B>A, C>B and D>C. According to the embodiments of the present application, a current target detection group matched with the external light source may be selected based on one or more switching of the detection groups, and brightness detection is performed by using the current target detection group, thereby improving the accuracy of the brightness detection result.

Exposure is a process of forming an image by receiving light from a lens through a sensing device. During the shooting process, the intensity of light and dark of a shooting background or a shooting subject will change. Overexposure is prone to occur in a case that the external light is intensified, resulting in that a shot image is too bright and lacks hierarchy and details; or underexposure is prone to occur in a case that the external light is weak, resulting in that a shot image is too dark to reflect the true color. Therefore, it is necessary to perform exposure control in the shooting process.

According to the embodiments of the present application, lookup may be performed in the mapping relationship between the brightness value and the exposure parameter based on the brightness value corresponding to the brightness detection result so as to obtain the exposure parameter of the photographic apparatus. The exposure parameter of the photographic apparatus may be used to shoot a first frame image. The first frame image may refer to a first frame image shot by the photographic apparatus after the photographic apparatus is started (the control unit of the photographic apparatus is awakened).

The exposure parameter of the embodiments of the present apparatus may include: at least one of an aperture parameter, exposure time and a gain. The aperture parameter uses a light incoming hole to control the luminance intensity of light arriving at a photosensitive chip during exposure, so that the amount of the incoming light can be controlled. The exposure time may control photon sampling time of the photosensitive chip based on the length of the starting time. The gain may refer to the sensitivity of a photosensitive component. The stronger the sensitivity, the larger the brightness of the image.

In conclusion, according to the control method for the photographic apparatus according to the embodiments of the present application, the working mode of the photographic apparatus is determined based on the brightness detection result. The brightness detection result obtained by the embodiments of the present application may meet both the preset precision requirement and the preset brightness range requirement, so the embodiments of the present application can improve the control precision of the photographic apparatus.

Method Embodiment 3

The embodiments of the present application describe a control method for a photographic apparatus by taking a starting scenario of a photographic apparatus with low power consumption and a brightness detection circuit including three detection groups as an example.

Referring to FIG. 4 which illustrates a schematic flowchart of steps of a control method for a photographic apparatus according to an embodiment of the present application. The method may specifically include the following steps:

Step 401: PIR awakens an MCU when detecting a person passing by.

Step 402: the MCU selects a detection group 1 from the three detection groups of the brightness detection circuit, and obtains a brightness detection result "X1" based on the detection group 1. The brightness range of the detection group 1 is [0,10] lux.

The process of obtaining the brightness detection result "X1" based on the detection group 1 may include: the MCU controls a switch to be connected to the detection group 1, performs voltage detection on the detection group 1, performs analog-digital conversion on a voltage detection result to obtain a digital voltage, and determining the brightness detection result "X1" based on the digital voltage.

In a case that a brightness range corresponding to a first target detection group is saturated (that is, an absolute value of a difference value is less than a difference threshold), it may be considered that the brightness detection result "X1" is not matched with the brightness range of the detection group 1.

Step 403: the MCU determines a working mode of the photographic apparatus based on a comparison result of the brightness detection result "X1" and a brightness threshold.

Step 404: in a case that "X1" is less than a first brightness threshold, the MCU sets the working mode of the photographic apparatus as a night mode; and in a case that the working mode of the photographic apparatus is set as the night mode, it is necessary to turn on an infrared lamp and switch a filter.

Step 405: in a case that "X1" is greater than or equal to a second brightness threshold, the MCU sets the working mode of the photographic apparatus as a daytime mode.

Step 406: the MCU determines whether the brightness detection result "X1" is matched with the brightness range of the detection group 1 or not, if it is "YES", Step 407 is performed, otherwise, Step 408 is performed.

Step 407: the MCU lookups in a mapping relationship between a brightness value and an exposure parameter based on the brightness detection result "X1" so as to obtain a first exposure parameter of a first frame image in the photographic apparatus.

Step 408: the MCU selects a detection group 2 from the three detection groups of the brightness detection circuit, and obtains a brightness detection result "X2" based on the detection group 2.

It should be noted that the brightness detection result "X1" being not matched with the brightness range of the detection group 1 indicates that an ambient brightness exceeds the brightness range of the detection group 1, so the ambient brightness may be greater than an upper limit value of the brightness range of the detection group 1.

Step 409: the MCU determines whether the brightness detection result "X2" is matched with the brightness range of the detection group 2 or not, if it is "YES", Step 410 is performed, otherwise, Step 411 is performed.

In a case that a brightness range corresponding to a second target detection group is saturated (that is, an absolute value of a difference value is less than a difference threshold), it may be considered that the brightness detection result "X2" is not matched with the brightness range of the detection group 2.

Step 410: the MCU lookups in the mapping relationship between the brightness value and the exposure parameter based on the brightness detection result "X2" so as to obtain a second exposure parameter of the first frame image in the photographic apparatus.

Step 411: the MCU selects a detection group 3 from the three detection groups of the brightness detection circuit, and obtains a brightness detection result "X3" based on the detection group 3; and a lookup is performed in the mapping relationship between the brightness value and the exposure parameter based on the brightness detection result "X3" so as to obtain a third exposure parameter of the first frame image in the photographic apparatus.

The first exposure parameter, the second exposure parameter or the third exposure parameter of the photographic apparatus may be used to shoot the first frame image. A first image may refer to a first frame image shot by the photographic apparatus after the photographic apparatus is started (the control unit of the photographic apparatus is awakened).

In actual application, in the embodiments of the present application, a sum of time spent in the steps of switching the detection groups, performing voltage detection, performing analog-digital conversion and the like usually does not exceed a stabilizing time of the infrared lamp and the filter, so the embodiments of the present application may not increase the starting time of the photographic apparatus.

It should be noted that for ease of description, the method embodiment is described as a series of action combinations, but those skilled in the art should learn that the embodiments of the present application are not limited to an order of actions described herein, because according to the embodiments of the present application, some steps may be performed in another order or at the same time. In addition, those skilled in the art should also know that all the embodiments described in this specification are preferred embodiments, and the related actions are not necessarily required in the embodiments of the present application.

Based on the above embodiments, this embodiment further provides a brightness detection apparatus. Referring to FIG. 5, the brightness detection apparatus performs brightness detection by using a brightness detection circuit. The brightness detection circuit includes: a photosensitive diode, a switch and at least two detection groups. The switch is connected to the photosensitive diode. The detection group includes: a sampling resistor and a capacitor connected in parallel. The photosensitive diode generates a photocurrent based on an external light source, a voltage magnitude across the sampling resistor is determined based on the photocurrent, and the capacitor is charged to the voltage magnitude. The at least two detection groups have corresponding brightness ranges obtained by dividing a preset brightness range. The brightness detection apparatus may specifically include: a selection module 501, a control module 502, a voltage processing module 503 and a result determining module 504.

The selection module 501 is configured to select a target detection group from the at least two detection groups.

The control module 502 is configured to control the switch to be connected to the target detection group.

The voltage processing module 503 is configured to perform voltage detection on the target detection group, and perform analog-digital conversion on a voltage detection result to obtain a digital voltage. The analog-digital conversion corresponds to a number N of sampling points. The at least two detection groups include: a preset detection group. The preset detection group corresponds to a target brightness range, and a ratio of a brightness span value corresponding to the target brightness range to the number N of the sampling points meets a preset precision requirement. N digital voltages are used to represent a brightness value corresponding to the target brightness range, and a detection precision of the target brightness range is the ratio of the brightness span value to the number N of the sampling points.

The result determination module 504 is configured to determine the brightness detection result based on the digital voltage.

In some embodiments, the selection module includes:
a detection group selection module, configured to select one target detection group from the at least two detection groups as a first target detection group; and
a detection group switching module, configured to: in a case that an absolute value of a difference value between the brightness detection result corresponding to the first target detection group and an upper limit value or a lower limit value of a brightness range corresponding to the first target detection group is less than a difference threshold, switch from the first target detection group to a second target detection group, where a lower limit value of a brightness range corresponding to the second target detection group is matched with the upper limit value of the brightness range corresponding to the first target detection group, or an upper limit value of the brightness range corresponding to the second target detection group is matched with the lower limit value of the brightness range corresponding to the first target detection group.

In some embodiments, the detection group selection module includes:
a ranking selection module, configured to: in a case that a photographic apparatus is activated, according to a ranking result of lower limit values or upper limit values of brightness ranges corresponding to the at least two detection groups, select one target detection group from the at least two detection groups as the first target detection group.

In some embodiments, the result determination module includes:
a sampling current value determination module, configured to: determine a sampling current value of the brightness detection circuit based on the digital voltage; and
a brightness detection result determination module, configured to: determine the brightness detection result corresponding to the sampling current value according to a mapping relationship between a current value and a brightness value.

In some embodiments, a resistance value of the sampling resistor in the detection group is determined according to brightness range corresponding to the detection group, the mapping relationship between the current value and the brightness value, a standard voltage corresponding to the photosensitive diode and the Ohm's law.

In conclusion, according to a shooting processing apparatus in the embodiments of the present application, the preset detection group is provided in the brightness detection circuit. The ratio of the target brightness range corresponding to the preset detection group to the number of the sampling points meets the preset precision requirement, so that the detection precision of the target brightness range can meet the preset precision requirement. For example, the target brightness range corresponding to the preset detection group is [0,10] lux. Assuming that the number of the sampling points is 2 to the $n^{th}$ (n may be a number of binary bits of the digital voltage) power. In a case that n is 10, the ratio of the target brightness range to the number of the sampling points is less than 0.01, and the precision requirement of 0.1 lux in some brightness ranges in the actual application can be met. It may be understood that those skilled in the art can divide the preset brightness range according to the actual application requirement so as to obtain the brightness ranges respectively corresponding to the preset detection group and other detection groups. The embodiments of the present application do not limit the specific detection group and the specific brightness range corresponding to the detection group.

Embodiments of the present application further provide the following processing procedure for obtaining a brightness detection result by using the brightness detection circuit: selecting a target detection group from the at least two detection groups; controlling the switch to be connected to the target detection group; performing voltage detection on the target detection group, and performing analog-digital conversion on a voltage detection result to obtain a digital voltage; and determining a brightness detection result based on the digital voltage. The brightness detection result obtained by the embodiments of the present application can meet both the preset precision requirement and the preset brightness range requirement, so the brightness detection result can be applied to a control procedure of the photographic apparatus.

Furthermore, the brightness detection circuit of the embodiments of the present application includes: a photosensitive diode, a switch, a sampling resistor, a capacitor and other electronic devices. The sampling resistor may be a universal resistor. All these electronic devices have the characteristic of low cost, so the embodiments of the present application can meet both the preset precision requirement and the present brightness range requirement while reducing the brightness detection cost.

Figure 6:
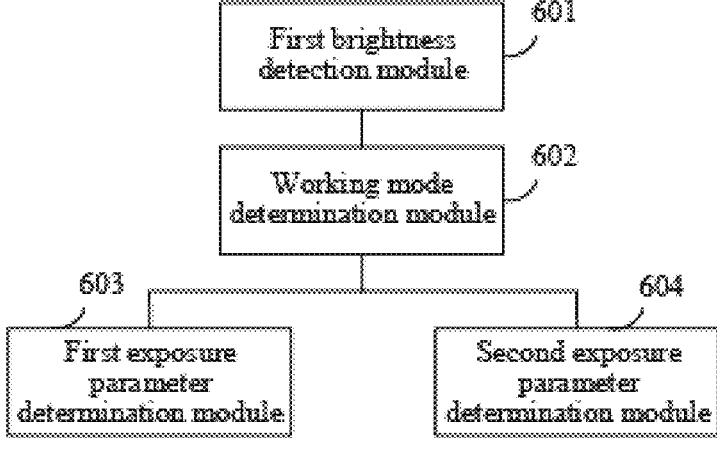
FIG. 6 is a schematic structural diagram of a control apparatus for a photographic apparatus according to an embodiment of the present application.

Based on the above embodiments, the embodiments of the present application further provide a control apparatus for a photographic apparatus. As shown in FIG. 6, the apparatus may specifically include: a first brightness detection module 601, a working mode determination module 602, a first exposure parameter determination module 603 and/or a second exposure parameter determination module 604.

The first brightness detection module 601 is configured to select a preset detection group from at least two detection groups in a brightness detection circuit, and determine a first brightness detection result by using the preset detection group. The preset detection group corresponds a target brightness range, for example, a lower limit value of the target brightness range is 0 lux, and an upper limit value of the target brightness range is A lux. A ratio of a brightness span value corresponding to the target brightness range to a number N of sampling points meets a preset precision requirement. N digital voltages are used to represent a brightness value corresponding to the target brightness range, and a detection precision of the target brightness range is the ratio of the brightness span value to the number N of the sampling points.

The working mode determination module 602 is configured to determine a working mode of the photographic apparatus based on the first brightness detection result. The working mode may include: a daytime mode or a night mode; and the night mode includes: a night mode with white light supplementation or a night mode without white light supplementation.

The first exposure parameter determination module 603 is configured to: in a case that the working mode of the photographic apparatus is the daytime mode or the night mode with white light supplementation, and an absolute value of a difference value between the first brightness detection result and the upper limit value of the target brightness range corresponding to the preset detection group exceeds a difference threshold, determine an exposure parameter of an image in the photographic apparatus based on the first brightness detection result.

The second exposure parameter determination module 604 is configured to: in a case that the working mode of the photographic apparatus is the daytime mode or the night mode with white light supplementation, and the absolute value of the difference value between the first brightness detection result and the upper limit value of the target brightness range corresponding to the preset detection group is less than the difference threshold, switch from the preset detection group to a third target detection group, determine a second brightness detection result by using the third target detection group, and determine the exposure parameter of the image in the photographic apparatus based on the second brightness detection result.

The brightness detection circuit includes: a photosensitive diode, a switch and at least two detection groups. The switch is connected to the photosensitive diode. The detection group includes: a sampling resistor and a capacitor connected in parallel. The at least two detection groups have corresponding brightness ranges obtained by dividing a preset brightness range. The photosensitive diode generates a photocurrent according to an external light source, a voltage magnitude across the sampling resistor is determined based on the photocurrent, and the capacitor is charged to the voltage magnitude. Voltage detection is performed on the preset detection group or the third target detection group, and analog-digital conversion is performed on a voltage detection result to obtain a digital voltage; and the first brightness detection result or the second brightness detection result is determined based on the digital voltage.

In some embodiments, the apparatus further includes:

a third exposure parameter determination module, configured to: in a case that an absolute value of a difference value between the second brightness detection result and an upper limit value of a brightness range corresponding to the third target detection group is less than the difference threshold, switch from the third target detection group to a fourth target detection group, determining a third brightness detection result by using the fourth target detection group, and determine the exposure parameter of the image in the photographic apparatus based on the third brightness detection result. The preset detection group, the third target detection group and the fourth target detection group form a brightness measurement range interval, a brightness lower limit value of a previous detection group is equal to a brightness upper limit value of a subsequent detection group, or each detection group has a same brightness lower limit value.

The modules may be implemented as a soft assembly executed on one or more universal processors, or may be implemented as hardware, for example, configured to perform some functions, such as, a programmable logic device and/or an application-specific integrated circuit. In some embodiments, these modules may be embodied in the form of software products, and the software products may be stored in non-volatile storage mediums. These non-volatile storage mediums include codes enabling a computer device (for example, a personal computer, a server, a network device and a mobile terminal) to perform the method described in the embodiments of the present disclosure. In some embodiments, the above modules may be implemented on a single device, or may be distributed on a plurality of devices. The functions of these modules may be mutually combined, or may be further split into a plurality of sub-modules.

The embodiments of the present application further provide a non-volatile storage medium. The storage medium stores one or more modules (programs). When the one or more modules are applied to a device, the device can execute instructions of each step of a method in the embodiments of the present application.

The embodiments of the present application provide one or more machine-readable mediums, having stored thereon instructions, which, when executed by one or more processor of an electronic device, cause the electronic device to perform a method according to one or more of the above embodiments. In the embodiments of the present application, the electronic device includes various types of devices such as a terminal device and a server (cluster).

The embodiments of the present application provide one or more computer program products, having stored thereon instructions, which, when executed by one or more processors, cause the processor to perform a method according to one or more of the above embodiments.

Figure 7:
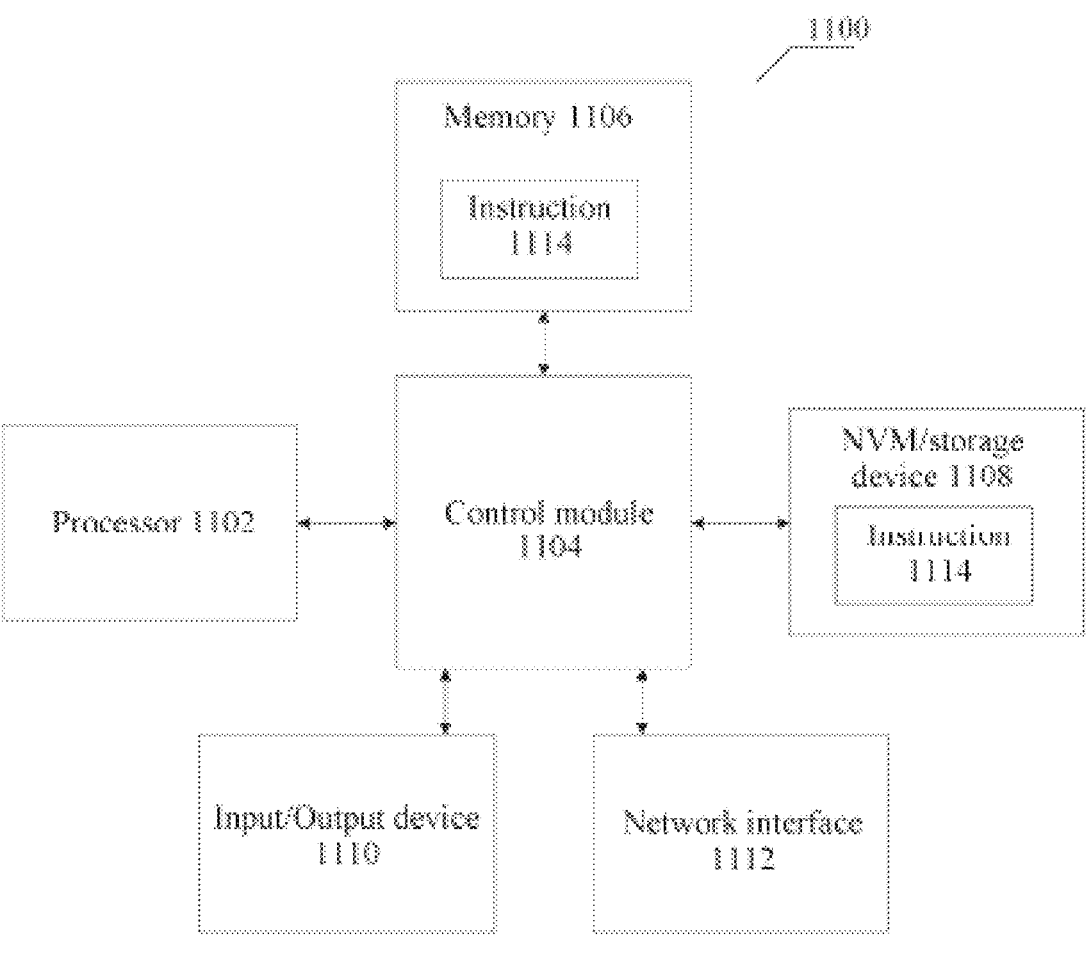
FIG. 7 is a schematic structural diagram of an apparatus according to an embodiment of the present application.

The embodiments of the present disclosure may be implemented as an apparatus that uses any suitable hardware, firmware, software or any combination thereof for a desired configuration. The apparatus may include: a terminal device, a server (cluster) and other electronic devices. FIG. 7 schematically shows an exemplary apparatus 1100 that can be configured to implement each embodiment of the present application.

For an embodiment, FIG. 7 shows an exemplary apparatus 1100. The apparatus has one or more processors 1102, at least one control module (chip group) 1104 coupled to the (one or more) processors 1102, a memory 1106 coupled to the control module 1104, a non-volatile memory (NVM)/storage device 1108 coupled to the control module 1104, one or more input/output devices 1110 coupled to the control module 1104, and a network interface 1112 coupled to the control module 1104.

The processors 1102 may include one or more single-core or multi-core processors. The processors 1102 may include any combination of a general-purpose processor or a specific-purpose processor (such as a graphics processor, an application processor and a baseband processor). In some embodiments, the apparatus 1100 can serve as the terminal device, the server (cluster) and other devices in the embodiments of the present application.

In some embodiments, the apparatus 1100 may include one or more computer-readable medium (for example, a memory 1106 or an NVM/storage device 1108) having instructions 1114, and one or more processors 1102 combined with the one or more computer-readable mediums and configured to execute the instructions 1114 to implement the modules so as to perform the actions in the present disclosure.

For an embodiment, the control module 1104 may include any suitable interface controller so as to provide any suitable interface to at least one of the (one or more) processors 1102 and/or any suitable device or assembly communicating with the control module 1104.

The control module 1104 may include a memory controller module so as to provide an interface to the memory 1106. The memory controller module may be a hardware module, a software module and/or a firmware module.

The memory 1106 may be configured to: for example, load and store data and/or instructions 1114 for the apparatus 1100. For an embodiment, the memory 1106 may include any suitable non-volatile memory, for example, a suitable DRAM. In some embodiments, the memory 1106 may include a Double-Data-Rate Fourth Generation Synchronous Dynamic Random Access Memory (DDR4SDRAM).

For an embodiment, the control module 1104 may include one or more input/output controllers so as to provide an interface to the NVM/storage device 1108 and (one or more) input/output devices 1110.

For example, the NVM/storage device 1108 may be configured to store data and/or instructions 1114. The NVM/storage device 1108 may include any suitable non-volatile Memory (for example, flash memory) and/or may include any suitable (one or more) non-volatile storage devices (for example, one or more hard disk drives (HDD), one or more optical disk (CD) drives and/or one or more digital versatile disk (DVD) drives).

The NVM/storage device 1108 may include a storage resource that physically serves as a part of a device of the apparatus 1100 mounted thereon, or may be accessed by the device and may not serve as a part of the device. For example, the NVM/storage device 1108 may be accessed via (one or more) input/output devices 1110 through a network.

The (one or more) input/output devices 1110 may provide an interface for the apparatus 1100 to communicate with any other suitable device. The input/output devices 1100 may include a communication assembly, an audio assembly and a sensor assembly. A network interface 1112 may provide an interface for the apparatus 1100 for communication through one or more networks. The apparatus 1100 may perform wireless communication with one or more assemblies of a wireless network according to one or more wireless network standards and/or any suitable standard in a protocol and/or the protocol, for example, performing wireless communication by accessing a wireless network based on a communication standard, such as WiFi, 2G, 3G, 4G and 5G, or a combination thereof.

For an embodiment, at least one of the (one or more) processors 1102 may be packaged with a logic of one or more controllers (for example, a memory controller module) of the control module 1104. For an embodiment, at least one of the (one or more) processors 1102 may be packaged with a logic of one or more controllers of the control module 1104 to form a system in package (SiP). For an embodiment, at least one of the (one or more) processors 1102 may be integrated with a logic of one or more controllers of the control module 1104 on a same mold. For an embodiment, at least one of the (one or more) processors 1102 may be integrated with a logic of one or more controllers of the control module 1104 on a same mold to form a system on chip (SoC).

In various embodiments, the apparatus 1100 may be but not limited to: a server, a desktop computing device or a mobile computer device (for example, a lap computer device, a handheld computing device, a tablet personal computer and a netbook) and other terminal devices. In various embodiments, the apparatus 1100 may have more or fewer assemblies and/or different architectures. For example, in some embodiments, the apparatus 1100 includes one or more cameras, a keyboard, a liquid crystal display (LCD) screen (including a touch screen display), a non-volatile memory port, a plurality of antennas, a graphics chip, an application-specific integrated circuit (ASIC) and a loudspeaker.

The detection apparatus may use a main control chip as a processor or control module. Sensor data and position information are stored in the memory and/or NVM/storage device. The sensor group may serve as an input/output device. The communication interface may include a network interface.

A system embodiment is basically similar to a method embodiment, and thus is described briefly. For related parts, reference may be made to partial descriptions in the method embodiment.

The embodiments in this specification are all described in a progressive manner. Descriptions of each embodiment focus on differences from other embodiments, and same or similar parts among respective embodiments may be mutually referenced.

The embodiments of the present application are described with reference to flowcharts and/or block diagrams of the method, the terminal device (the system), and the computer program product in the embodiments of the present application. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a dedicated computer, an embedded processor, or a processor of any other programmable data processing terminal device to produce a machine, so that the instructions executed by a computer or a processor of any other programmable data processing terminal device produce an apparatus for implementing a specified function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an article that includes an instruction apparatus. The instruction apparatus implements a specific function in one or more procedures in the flowcharts and/or in one or more blocks in the block diagrams.

These computer program instructions may also be loaded onto a computer or another programmable data processing terminal device, so that a series of operations and steps are performed on the computer or the another programmable terminal device, thereby generating computer-implemented processing. Therefore, the instructions executed on the computer or the another programmable terminal device provide steps for implementing a specific function in one or more procedures in the flowcharts and/or in one or more blocks in the block diagrams.

Although preferred embodiments of the embodiments of the present application have been described, persons skilled in the art can make additional changes and modifications to these embodiments once they know the basic creative concept of the present application. Therefore, the attached claims are intended to cover the preferred embodiments and all changes and modifications falling within the scope of the embodiments of the present application.

Finally, it should be noted that: in this specification, relational terms such as first and second are only used to differentiate one entity or operation from another entity or operation, and do not necessarily require or imply that any such actual relation or sequence exists between these entities or operations. Moreover, the terms "include", "comprise" and any variation thereof are intended to cover a non-exclusive inclusion. Therefore, in the context of a process, a method, an object, or a terminal device that includes a series of elements not only includes such elements, but also includes other elements not specified expressly, or may include inherent elements of the process, method, object, or terminal device. In absence of more restrictions, an element limited by "include a/an . . . " does not exclude other same elements existing in the process, the method, the article, or the terminal device which includes the element.

The brightness detection method and apparatus, the control method and apparatus for the photographic apparatus, the electronic device and the machine-readable medium provided by the embodiments of the present application are described above in detail. The principle and implementation manner of the present application are illustrated by applying specific examples herein. The description of the above embodiments is only used to help understand the method and the core idea of the present application. Those skilled in the art may make modifications to the specific implementation manners and application scopes according to the ideas of the present application. In conclusion, the content of the specification should not be construed as a limitation to the present application.

28

What is claimed is:

1. A brightness detection method, wherein a brightness detection circuit is used to perform brightness detection, wherein the brightness detection circuit comprises: a photosensitive diode, a switch, and at least two detection groups, the switch is connected to the photosensitive diode, and the detection group comprises: a sampling resistor and a capacitor connected in parallel; wherein the at least two detection groups have corresponding brightness ranges obtained by dividing a preset brightness range; and the method comprises:

selecting a target detection group from the at least two detection groups;

controlling the switch to be connected to the target detection group;

performing voltage detection on the target detection group, and performing analog-digital conversion on a voltage detection result to obtain a digital voltage; wherein the analog-digital conversion corresponds to a number N of sampling points; wherein the at least two detection groups comprise a preset detection group, the preset detection group corresponds to a target brightness range, and a ratio of a brightness span value corresponding to the target brightness range to the number N of the sampling points meets a preset precision requirement; and wherein N digital voltages are used to represent a brightness value corresponding to the target brightness range, and a detection precision of the target brightness range is the ratio of the brightness span value to the number N of the sampling points; and determining a brightness detection result based on the digital voltage.

2. The method according to claim 1, wherein the selecting a target detection group from the at least two detection groups comprises:

selecting one detection group from the at least two detection groups as a first target detection group; and in response to that an absolute value of a difference value between a brightness detection result corresponding to the first target detection group and an upper limit value or a lower limit value of a brightness range corresponding to the first target detection group is less than a difference threshold, switching from the first target detection group to a second target detection group, wherein a lower limit value of a brightness range corresponding to the second target detection group is matched with the upper limit value of the brightness range corresponding to the first target detection group, or an upper limit value of the brightness range corresponding to the second target detection group is matched with the lower limit value of the brightness range corresponding to the first target detection group.

3. The method according to claim 2, wherein the selecting one detection group from the at least two detection groups as the first target detection group comprises:

in response to that a photographic apparatus is activated, based on a ranking result of lower limit values or upper limit values of brightness ranges corresponding to the at least two detection groups, selecting one detection group from the at least two detection groups as the first target detection group.

4. The method according to claim 1, wherein the determining the brightness detection result based on the digital voltage comprises:

determining a sampling current value of the brightness detection circuit based on the digital voltage; and determining the brightness detection result corresponding to the sampling current value based on a mapping relationship between a current value and a brightness value.

5. The method according to claim 1, wherein a resistance value of the sampling resistor in the detection group is determined based on the brightness range corresponding to the detection group, a mapping relationship between a current value and a brightness value, a standard voltage corresponding to the photosensitive diode, and the Ohm's law.

6. A non-transitory machine-readable medium, having stored thereon an executable code, which, when executed, cause a processor to perform the method according to claim 1.

7. A control method for a photographic apparatus, comprising:

selecting a preset detection group from at least two detection groups in a brightness detection circuit, and determining a first brightness detection result by using the preset detection group, wherein the preset detection group corresponds to a target brightness range, and a ratio of a brightness span value corresponding to the target brightness range to a number N of sampling points meets a preset precision requirement; and wherein N digital voltages are used to represent a brightness value corresponding to the target brightness range, and a detection precision of the target brightness range is the ratio of the brightness span value to the number N of the sampling points;

determining a working mode of the photographic apparatus based on the first brightness detection result; wherein the working mode comprises: a daytime mode or a night mode; and wherein the night mode comprises: a night mode with white light supplementation or a night mode without white light supplementation;

in response to that the working mode of the photographic apparatus is the daytime mode or the night mode with white light supplementation, and an absolute value of a difference value between the first brightness detection result and an upper limit value of the target brightness range corresponding to the preset detection group exceeds a difference threshold, determining an exposure parameter of an image in the photographic apparatus based on the first brightness detection result; or in response to that the working mode of the photographic apparatus is the daytime mode or the night mode with white light supplementation, and the absolute value of the difference value between the first brightness detection result and the upper limit value of the target brightness range corresponding to the preset detection group is less than the difference threshold, switching from the preset detection group to a third target detection group, determining a second brightness detection result by using the third target detection group, and determining the exposure parameter of the image in the photographic apparatus based on the second brightness detection result, wherein the brightness detection circuit comprises: a photosensitive diode, a switch, and the at least two detection groups, the switch is connected to the photosensitive diode, and the detection group comprises: a sampling resistor and a capacitor connected in parallel; wherein the at least two detection groups have corresponding brightness ranges obtained by dividing a preset brightness range; and the determining the first brightness detection result by using the preset detection group or the determining the second brightness detection result by using the third target detection group comprises: performing voltage detection on the preset detection group or the third target detection group, and performing analog-digital conversion on an obtained voltage detection result to obtain a digital voltage, and determining the first brightness detection result or the second brightness detection result based on the digital voltage.

8. An electronic device, comprising:

a processor; and a memory, having stored thereon an executable code, which, when executed, cause the processor to perform the method according to claim 7.

9. A non-transitory machine-readable medium, having stored thereon an executable code, which, when executed, cause a processor to perform the method according to claim 7.

10. The method according to claim 7, further comprising:

in response to that an absolute value of a difference value between the second brightness detection result and an upper limit value of a brightness range corresponding to the third target detection group is less than the difference threshold, switching from the third target detection group to a fourth target detection group, determining a third brightness detection result by using the fourth target detection group, and determining the exposure parameter of the image in the photographic apparatus based on the third brightness detection result, wherein the preset detection group, the third target detection group, and the fourth target detection group form brightness measurement range intervals, a brightness lower limit value of a previous detection group is equal to a brightness upper limit value of a subsequent detection group, or each detection group has a same brightness lower limit value.

11. An electronic device, comprising:

a processor; and a memory, having stored thereon an executable code, which, when executed, cause the processor to perform a brightness detection method, wherein a brightness detection circuit is used to perform brightness detection, wherein the brightness detection circuit comprises: a photosensitive diode, a switch, and at least two detection groups, the switch is connected to the photosensitive diode, and the detection group comprises: a sampling resistor and a capacitor connected in parallel; wherein the at least two detection groups have corresponding brightness ranges obtained by dividing a preset brightness range; and the method comprises:

selecting a target detection group from the at least two detection groups;

controlling the switch to be connected to the target detection group;

performing voltage detection on the target detection group, and performing analog-digital conversion on a voltage detection result to obtain a digital voltage; wherein the analog-digital conversion corresponds to a number N of sampling points; wherein the at least two detection groups comprise a preset detection group, the preset detection group corresponds to a target brightness range, and a ratio of a brightness span value corresponding to the target brightness range to the number N of the sampling points meets a preset precision requirement; and wherein N digital voltages are used to represent a brightness value corresponding to the target brightness range, and a detection precision of the target brightness range is the ratio of the brightness span value to the number N of the sampling points; and determining a brightness detection result based on the digital voltage.

12. The electronic device according to claim 11, wherein the selecting a target detection group from the at least two detection groups comprises:

selecting one detection group from the at least two detection groups as a first target detection group; and in response to that an absolute value of a difference value between a brightness detection result corresponding to the first target detection group and an upper limit value or a lower limit value of a brightness range corresponding to the first target detection group is less than a difference threshold, switching from the first target detection group to a second target detection group, wherein a lower limit value of a brightness range corresponding to the second target detection group is matched with the upper limit value of the brightness range corresponding to the first target detection group, or an upper limit value of the brightness range corresponding to the second target detection group is matched with the lower limit value of the brightness range corresponding to the first target detection group.

13. The electronic device according to claim 12, wherein the selecting one detection group from the at least two detection groups as the first target detection group comprises:

in response to that a photographic apparatus is activated, based on a ranking result of lower limit values or upper limit values of brightness ranges corresponding to the at least two detection groups, selecting one detection group from the at least two detection groups as the first target detection group.

14. The electronic device according to claim 11, wherein the determining the brightness detection result based on the digital voltage comprises:

determining a sampling current value of the brightness detection circuit based on the digital voltage; and determining the brightness detection result corresponding to the sampling current value based on a mapping relationship between a current value and a brightness value.

15. The electronic device according to claim 11, wherein a resistance value of the sampling resistor in the detection group is determined based on the brightness range corresponding to the detection group, a mapping relationship between a current value and a brightness value, a standard voltage corresponding to the photosensitive diode, and the Ohm's law.

* * * * *